United States Patent [19]

Ott et al.

[11] Patent Number: 5,262,465
[45] Date of Patent: Nov. 16, 1993

[54] PROCESS FOR COATING ELECTRICALLY CONDUCTIVE SUBSTRATES, AQUEOUS COATING COMPOSITION, PROCESS FOR THE PREPARATION OF A CATIONIC, AMINE-MODIFIED EPOXY RESIN AND CATIONIC, AMINE-MODIFIED EPOXY RESIN PREPARED ACCORDING TO THIS PROCESS

[75] Inventors: Günther Ott; Ulrich Heimann, both of Münster, Fed. Rep. of Germany; David J. Santure, Novi, Mich.; Udo Reiter, Telgte, Fed. Rep. of Germany

[73] Assignee: BASF Lacke & Farben Aktiengesellschaft, Munster, Fed. Rep. of Germany

[21] Appl. No.: 777,339

[22] PCT Filed: May 25, 1990

[86] PCT No.: PCT/EP90/00843

§ 371 Date: Dec. 11, 1991

§ 102(e) Date: Dec. 11, 1991

[87] PCT Pub. No.: WO90/15108

PCT Pub. Date: Dec. 13, 1990

[30] Foreign Application Priority Data

Jun. 7, 1989 [DE] Fed. Rep. of Germany ....... 3918511

[51] Int. Cl.$^5$ .............................................. C08L 63/02
[52] U.S. Cl. .................................. 523/415; 523/417; 204/181.4; 204/181.7
[58] Field of Search ............................. 523/415, 417; 204/181.4, 181.7

[56] References Cited

U.S. PATENT DOCUMENTS

| | | | |
|---|---|---|---|
| 3,947,339 | 3/1976 | Jerabek et al. | 524/901 |
| 4,824,927 | 4/1989 | Dobbelstein et al. | 523/415 |
| 4,956,402 | 9/1990 | Perner et al. | 523/415 |

*Primary Examiner*—Melvyn I. Marquis
*Assistant Examiner*—D. Aylward
*Attorney, Agent, or Firm*—Frank G. Werner; Paul L. Marshall

[57] ABSTRACT

The invention relates to a cathodic electro-dipcoating process, wherein the electro-dipcoating composition used contains a cationic, amine-modified epoxy resin, which is obtainable by reacting (A) a polyepoxide,
(B) an amine and
(C) an adduct, which is obtainable by . . . (sic)
   (c1) a polyether- or polyester-polyol,
   (c2) a polyisocyanate and
   (c3) a compound which contains at least one hydrogen atom which is reactive towards isocyanate groups and at least one ketimine group in the molecule, and/or
(D) a hydrolysis product of (C)

with one another in a relative proportion such that 20 to 90% of the epoxy groups of component (A) are reacted with component (B) and the remaining epoxy groups are reacted with component (C) and/or (D), and—if still necessary—at least partially protonating the reaction product thus obtained.

16 Claims, No Drawings

PROCESS FOR COATING ELECTRICALLY CONDUCTIVE SUBSTRATES, AQUEOUS COATING COMPOSITION, PROCESS FOR THE PREPARATION OF A CATIONIC, AMINE-MODIFIED EPOXY RESIN AND CATIONIC, AMINE-MODIFIED EPOXY RESIN PREPARED ACCORDING TO THIS PROCESS

The invention relates to a process for coating electrically conductive substates, in which
(1) the substrate is dipped into an aqueous electro-dipcoating composition, which contains at least one cationic, amine-modified epoxy resin as binder,
(2) the substrate is connected as cathode
(3) a film is deposited on the substrate by means of direct current
(4) the substrate is removed from the electro-dipcoating composition and
(5) the deposited coating film is baked.

The invention also relates to an aqueous coating composition, which contains a cationic, amine-modified epoxy resin as binder, a process for the preparation of a cationic, amine-modified epoxy resin and a cationic, amine-modified epoxy resin prepared according to this process.

The process described above is known (cf. for example, DE-OS 3,518,732, DE-OS 3,518,770 and U.S. Pat. No. 3,984,299) and is used particularly for priming automobile bodies. The coatings obtainable by the process described above need to be improved in respect of layer thickness, flow properties, stone-chip resistance, flexibility, adhesion characteristics and corrosion protection on non-pretreated sheet metal.

In the process described above it is also desirable to use electro-dipcoating compositions with a very low organic solvent content.

The underlying object of the present invention comprises the provision of a new process in accordance with the preamble of patent claim 1, with which coatings can be obtained which do not have the disadvantages of the prior art described above or have then disadvantages to a lesser extent.

This object is surprisingly achieved by a process in accordance with the preamble of patent claim 1, in which the electro-dipcoating composition contains a cationic, amine-modified epoxy resin which is obtainable by reacting
(A) a compound which contains on average 1.0 to 5.0, preferably 1.2 to 2.5 and particularly preferentially 2.0 epoxy groups per molecule, or a mixture of such compounds, and
(B) an organic amine or a mixture of organic amines and
(C) an adduct containing urethane groups, which is obtainable by reacting
(c1) a polyether- or polyester-polyol with a number-average molecular weight of 400 to 5,000, preferably 600 to 2,000, or a mixture of such polyether- and/or polyester-polyols,
(c2) a polyisocyanate or a mixture of polyisocyanates and
(c3) a compound which contains at least one hydrogen atom which is reactive towards isocyanate groups and at least one ketimine group in the molecule, or a mixture of such compounds, with one another, and/or
(D) a urethane group-containing adduct, which is obtainable by converting at least one ketimine group in component (C) to a primary amino group by hydrolysis,
with one another in a relative proportion such that 20 to 90, preferably 60 to 80% of the epoxy groups of component (A) are reacted with component (B) and the remaining epoxy groups are reacted with component (C) and/or (D) and —if still necessary—is at least partially protonating the reaction product thus obtained.

The coatings prepared in accordance with the process according to the invention are distinguished by large layer thicknesses, good flow properties, high stone-chip resistance, high flexibility, good adhesion characteristics and good corrosion protection on non-pretreated sheet metal. A further important advantage of the process according to the invention is that the electro-dipcoating compositions used, which, in comparison to the prior art, have a very low organic solvent content, produce coatings with the good properties described above.

The cationic, amine-modified epoxy resins used according to the invention are obtainable by reacting the components (A) and (B) and (C) and/or (D) with one another in a relative proportion such that 20 to 90, preferably 60 to 80% of the epoxy groups of component (A) are reacted with component (B) and the remaining epoxy groups are reacted with component (C) and/or (D) and the reaction product thus obtained is—if necessary—at least partially protonated. The reaction of the components (A), (B), (C) and/or (D) is carried out in an organic solvent (for example xylene, butyl glycol, butanol and the like.) or in a mixture of organic solvents, at temperatures of from 20° to 160° C., preferably 80° to 130° C. If a substance containing ketimine groups is used as component (C) and/or (D), it is then expedient to carry out the reaction in the presence of water and/or a Brønsted acid. It is preferred to react the components (A) and (B) in a first step to give an intermediate containing epoxy groups, and then to react this intermediate with component (C) and/or (D) in a second step. In principle it is also possible—but less preferred—to prepare an intermediate containing epoxy groups from components (A) and/or (C) and/or (D), which intermediate is further reacted with component (B) in a second step. With this procedure suitable measures (for example low content of (potential) primary amino groups in component (C) and/or (D), low reaction temperature . . . ) must be taken to avoid obtaining a gelled product. If still necessary the reaction product obtained is at least partially protonated with a Brønsted acid and converted to an aqueous phase (a protonation is, for example, not necessary if an amine salt is used as component (B) or if the reaction with component (C) and/or (D) is carried out in the presence of an adequate amount of a Brønsted acid). An electro-dipcoating composition can then be prepared from the dispersion thus obtained using generally well known methods.

All compounds which contain on average 1.0 to 5.0, preferably 1.2 to 2.5 and particularly preferentially 2.0, epoxy groups per molecule, or mixtures of such compounds can be used as component (A). Component (A) should have a number-average molecular weight of 112 to 5,000, preferably 800 to 3,000.

Polyglycidyl ethers prepared from polyphenols and epihalohydrins are preferably used as component (A). The following are mentioned as examples of polyphenols: bisphenol A (preferred), bisphenol F, 4,4'-dihydroxybenzophenone, 1,1-bis-(4-hydroxyphenyl)-ethane, 1,1-bis-(4-hydroxyphenyl)-isobutane, 2,2-bis-(4-hydroxy-tertiarybutylphenyl)-propane, bis-(2-hydroxynaphthyl)-methane, 1,5-dihydroxynaphthalene and phenolic novolak resins.

Polyglycidyl ethers of polyhydric alcohols, such as, for example, ethylene glycol, diethylene glycol, triethylene glycol, 1,2-propylene glycol, 1,4-propylene glycol, 1,5-pentanediol, 1,2,6-hexanetriol, glycerol 2,2-bis-(4-hydroxycyclohexyl)-propane poly(ethylene oxide) poly(propylene oxide) and poly(tetrahydrofuran) can also be used as component (A).

Polyglycidyl esters of polycarboxylic acids such as, for example, oxalic acid, succinic acid, glutaric acid, terephthalic acid, 2,6-naphthalenedicarboxylic acid, dimerized linoleic acid and adipic acid can also be used as component (A).

Furthermore, hydantoin epoxides, epoxidized polybutadiene and polyepoxide compounds, which are obtained by epoxidation of an olefinically unsaturated aliphatic compound, can also be used as component (A).

In many cases it is useful to use an epoxide group-containing reaction product of a polyepoxide compound and one or more modifying compounds as component (A).

The following are mentioned as examples of modifying compounds:

a) compounds containing carboxyl groups, such as saturated or unsaturated monocarboxylic acids (for example benzoic acid, linseed oil fatty acid, 2-ethylhexanoic acid, versatic acid), aliphatic, cycloaliphatic and/or aromatic dicarboxylic acids of various chain lengths (for example adipic acid, sebacic acid, isophthalic acid or dimeric fatty acids), hydroxyalkylcarboxylic acids (for example lactic acid, dimethylolpropionic acid) and polyesters containing carboxyl groups, or b) compounds containing amino groups, such as diethylamine or ethylhexylamine or diamines containing secondary amino groups, for example N,N'-dialkylalkylenediamines such as dimethylethylenediamine, N,N'-dialkyl-polyoxyalkyleneamines such as N,N'-dimethyl-polyoxypropylenediamine, cyanoalkylated alkylenediamines such as bis-N,N'-cyanoethylethylenediamine, cyanoalkylated polyoxyalkyleneamines such as bis-N,N'-cyanoethylpolyoxypropylenediamine, polyaminoamides such as, for example, versamides, in particular reaction products containing terminal amino groups and obtained from diamines (for example hexamethylenediamine), polycarboxylic acids, in particular fatty acid dimers and monocarboxylic acids, in particular fatty acids, or the reaction product of one mole of diaminohexane with two moles of monoglycidyl ether or monoglycidyl ester, especially glycidyl esters of α-branched fatty acids such as versatic acid, or c) compounds containing hydroxyl groups, such as neopentyl glycol, bis-ethoxylated neopentyl glycol, neopentyl glycol hydroxypivalate, dimethylhydantoinN,N'-diethanol, 1,6-hexanediol, 2,5-hexanediol, 1,4-bis-(hydroxymethyl)-cyclohexane, 1,1-isopropylidenebis-(p-phenoxy)-2-propanol,trimethylolpropane,pentaerythritol or aminoalcohols such as triethanolamine, methyldiethanolamine or alkylketimines containing hydroxyl groups, such as aminomethylpropane-1,3-diolmethylisobutylketimine or tris-(hydroxymethyl)-aminomethanecyclohexanoneketimine and also polyglycol ethers, polyester-polyols, polyether-polyols, polycaprolactone-polyols, and polycaprolactam-polyols having differing numbers of groups functional and molecular weights, or d) saturated or unsaturated fatty acids methyl, which are transesterified with hydroxyl groups of the epoxy resins in the presence of catalysts such as sodium methylate.

Compounds very particularly preferentially used as component (A) are those which are obtainable, by reacting (i) a diepoxide compound (preferably a bisphenol A diglycidyl ether), or a mixture of diepoxide compounds having an epoxide equivalent weight below 2,000, with (ii) a compound which contains one—and only one—phenolic hydroxyl group (preferably an alkylphenol) or one—and only one—thiol group in the molecule, in such a manner that a reaction product is obtained in which the components (i) and (ii) are incorporated in a molar ratio of 2:1 to 10:1, preferably 2:1 to 4:1 and particularly preferentially 2:1. Compounds of this type are disclosed in DE-OS 3,518,770 and DE-OS 3,518,732.

Primary and/or secondary amines can be used as component (B).

The amine used as component (B) should preferably be water-soluble. The following are mentioned as examples of amines that can be used: mono- and di-alkylamines, such as methylamine, ethylamine, propylamine, butylamine, dimethylamine, diethylamine, dipropylamine, methylbutylamine and the like, alkanolamines, such as, for example, methylethanolamine, diethanolamine and the like, and dialkylaminoalkylamines, such as, for example, dimethylaminoethylamine, diethylaminopropylamine, dimethylaminopropylamine and the like. In most cases low-molecular amines are used, but it is also possible to use higher-molecular monoamines or mixtures of low-molecular and higher-molecular amines.

Polyamines containing primary and secondary amino groups can be reacted in the form of their ketimine with the epoxide groups. The ketimines are prepared from the polyamines in a known manner.

Salts of primary, secondary and tertiary amines can also be used as component (B). Suitable acids for the neutralization of the amines include boric acid or other acids with a larger dissociation constant than boric acid, preferably organic acids with a dissociation contant larger than approximately $1 \times 10^{-5}$. The preferred acid is lactic acid. Examples of other acids are formic acid, acetic acid, propionic acid, butyric acid, hydrochloric acid, phosphoric acid, sulfuric acid and carbonic acid. The amine part of the amine acid salt is preferably a tertiary amine, such as, for example, dimethylethanolamine, triethylamine, trimethylamine, triisopropylamine and the like.

An adduct containing urethane groups is used as component (C), which adduct is obtainable by reacting (c1) a polyether- or polyester-polyol with a number-average molecular weight of 400 to 5,000, preferably 600 to 2,000, or a mixture of such polyether- and/or polyester-polyols, (c2) a polyisocyanate or a mixture of polyisocyanates and (c3) a compound which contains at least one hydrogen atom which is reactive towards isocyanate groups and at least one ketimine group in the molecule, or a mixture of such compounds,
with one another.

To prepare the component (C), the components (c1), (c2) and (c3) can be reacted with one another either in bulk or in a solvent or solvent mixture that is inert towards isocyanate groups, if necessary at elevated temperatures, preferably at 40° to 100° C. The reaction can be catalyzed by addition of catalysts such as, for example, dibutyltin dilaurate.

The components (c1), (c2) and (c3) are reacted with one another in a relative proportion such that there are 0.75 to 1.5, preferably 0.9 to 1.1 and particularly preferentially 1.0, equivalents of hydrogen atoms reactive towards isocyanate groups per equivalent of isocyanate groups. If a polyether- or polyester-diol is used as component (c1) and a diisocyanate is used as component (c2), then preferably n moles of component (c1), n+1 moles of component (c2) and 2 moles of component (c3) are reacted with one another.

It is preferred to use a polyether- or polyester-diol, or a mixture of polyether- and/or polyester-diols, as component (c1) and a diisocyanate, or a mixture of diisocyanates, as component (c2). Polyether- and/or polyester-polyols and/or polyisocyanates containing a higher number of functional groups can also be used. However in such cases care must be taken—for example, by admixture of monofunctional reactants—to avoid a gelation of the reaction mixture.

There are several possibilities for the sequence in which the components (c1), (c2) and (c3) can be reacted: thus, for example, a prepolymer having terminal isocyanate groups can be prepared in a first stage from components (c1) and (c2), the isocyanate groups of said prepolymer then being reacted with component (c3) in a second stage. However it is also possible initially to introduce components (c1) and (c3) and slowly to add component (c2). A third variant comprises preparing a isocyanate group-containing precursor from components (c2) and (c3) in a first stage, which precursor is then reacted with component (c1) in a second stage.

Component (D) can be obtained by converting at least one ketimine group in component (C) to a primary amino group by hydrolysis. This is expediently carried out by adding water to the reaction product obtained from (c1), (c2) and (c3).

A polyether- or polyester-polyol with a number-average molecular weight of 400 to 5,000, preferably 600 to 2,000, or a mixture of such polyether- and/or polyester-polyols, is used as component (c1). Preferably, a polyether- or polyester-diol with a number-average molecular weight of 400 to 5,000, preferably 600 to 2,000, or a mixture of such polyether- and/or polyester-diols, is used as component (c1). Polyetherdiols with a number-average molecular weight of 400 to 5,000, preferably 600 to 2,000, are particularly preferentially used as component (c1).

Aliphatic polyetherdiols of the general formula H—(—O(CHR)$_n$—)$_m$—OH are mentioned as examples of suitable polyether-polyols. R=hydrogen or a lower alkyl radical, n=2 to 6, preferably 3 to 4, and m=2 to 100, preferably 5 to 50. Linear or branched polyether-polyols such as poly(ethylene oxide), poly(propylene oxide), poly(butylene oxide) and/or polyether-polyols obtained by copolymerization of ethylene oxide with propylene oxide can be used as component (c1). Particularly preferentially poly(propylene oxide) and copolymers of ethylene oxide and propylene oxide with a number-average molecular weight of 600 to 2,000 are used as component (c1).

Of course, mixtures of different polyether-polyols can also be used as component (c1).

Polyester-polyols, in particular polyesterdiols, with a number-average molecular weight of 400 to 5,000, preferably 600 to 2,000, can also be used as component (A).

Polyesterdiols are prepared by esterification of organic dicarboxylic acids or their anhydrides with organic diols, or are derived from a hydroxycarboxylic acid or a lactone. Polyols or polycarboxylic acids having a higher valency can be used to a small extent to prepare branched polyester-polyols. The dicarboxylic acids and diols can be linear or branched aliphatic, cycloaliphatic or aromatic dicarboxylic acids or diols.

The diols used for the preparation of the polyesters consist, for example, of alkylene glycols such as ethylene glycol, propylene glycol, butylene glycol, butane-1,4-diol, hexane-1,6-diol, neopentyl glycol and other diols such as dimethylolcyclohexane.

The acid component of the polyester consists primarily of low-molecular dicarboxylic acids or their anhydrides having 2 to 30, preferably 4 to 18, carbon atoms in the molecule. Suitable acids are, for example, o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acid. Instead of these acids their anhydrides can also be used, insofar as these exist. In the formation of polyester-polyols smaller amounts of carboxylic acids having 3 or more carboxyl groups, for example trimellitic anhydride or the adduct of maleic anhydride, with unsaturated fatty acids, can also be present.

According to the invention polyesterdiols which are obtained by reacting a lactone with a diol are also used. They are distinguished by the presence of a terminal hydroxyl group and repeating polyester segments of the formula CO—(CHR)$_n$—CH$_2$—O. In this formula n is preferably 4 to 6 and the substituent R is hydrogen or an alkyl, cycloalkyl or alkoxy radical. No substituent contains more than 12 carbon atoms. The following are mentioned as examples: poly(hydroxycaproic acid), poly(hydroxybutyric acid), poly(hydroxydecanoic acid) and poly(hydroxystearic acid). Unsubstituted ε-caprolactone, in which n has the value 4 and all R substituents are hydrogen, is preferred for the preparation of the polyesterdiols. The reaction with lactone is started by low-molecular polyols such as ethylene glycol, 1,3-propanediol, 1,4-butanediol and dimethylolcyclohexane. However, other reaction components, such as ethylenediamine, alkyldialkanolamines or also urea, can also be reacted with caprolactone.

Aliphatic, cycloaliphatic and/or aromatic polyisocyanates containing at least two isocyanate groups per molecule can be used as component (c2). Diisocyanates are preferably used as component (c2). Suitable aromatic diisocyanates are phenylene diisocyanate, toluylene diisocyanate, xylylene diisocyanate, biphenylene diisocyanate, naphthylene diisocyanate and diphenylmethane diisocyanate.

Because of their good resistance to ultraviolet light, (cyclo)aliphatic diisocyanates produce products having a low tendency to yellowing. Examples of (cyclo)aliphatic diisocyanates are isophorone diisocyanate, cyclopentylene diisocyanate and the hydrogenation products of the aromatic diisocyanates, such as cyclohexylene diisocyanate, methylcyclohexylene diisocyanate, and dicyclohexylmethane diisocyanate. Aliphatic diisocyanates are compounds of the formula $OCN-(CR_2)_r-NCO$, in which r is an integer from 2 to 20, in particular 6 to 8, and R, which can be the same or different, represents hydrogen or a lower alkyl radical having 1 to 8 C atoms, preferably 1 or 2 C atoms. Examples of these compounds are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate. Isophorone diisocyanate and dicyclohexylmethane diisocyanate are particularly preferred diisocyanates.

Mixtures of different polyisocyanates can, of course, also be used.

Compounds which contain a hydrogen atom which is reactive towards isocyanate groups and at least one ketimine group in the molecule can be used as component (c3). These compounds can be obtained by generally well known methods by reacting compounds which contain a hydrogen atom which is reactive towards isocyanate groups and at least one primary amine group in the molecule with ketones. Examples which may be mentioned of compounds which contain a hydrogen atom which is reactive towards isocyanate groups and at least one primary amino group in the molecule are compounds which contain a secondary amino group and at least one primary amino group in the molecule (for example N-alkylalkylenediamines, such as N-methylethylenediamine, and polyalkylenepolyamines, such as diethylenetriamine) and compounds of the general formula $H_2N-CR_1R_2-R_3-O(CHR_4-CHR_5-O)_n-H$. In this formula $R_1$ and $R_2$ represent hydrogen, alkyl or $-CH_2OH$ groups, $R_3$ represents a linear or branched alkylene radical, in particular an alkylene radical having 1 to 3 carbon atoms, $R_4$ and $R_5$ represent hydrogen or alkyl radicals having 1 to 4 carbon atoms and $n=0$ to 5. The following are mentioned as specific examples ethanolamine, propanolamine, butanolamine, 2-amino-2-methyl-propan-1-ol $(H_2N-C(CH_3)_2-CH_2OH)$, 2-amino-2-ethyl-propan-1-ol and elhoxylated and/or propoxylated ethanolamine or propanolamine such as, for example, 2,2'-aminoethoxyethanol $(H_2N-CH_2CH_2-O-CH_2-CH_2-OH)$ and diethylene glycol mono-(3-aminopropyl) ether $(H_2N-(CH_2)_3-O-CH_2-CH_2-O-CH_2-CH_2-OH)$. Aminophenols can also be used. However, these are less preferred. The primary amino groups of the compounds which contain a hydrogen atom which is reactive towards isocyanate groups and at least one primary amino group in the molecule are converted into ketimine groups using ketones in accordance with generally well known methods (cf., for example, DE-OS 3,519,953). The ketones used can be, for example, acetone, methyl ethyl ketone, diethyl ketone, methyl propyl ketone, methyl isopropyl ketone, methyl n-butyl ketone, methyl isobutyl ketone, ethyl isopropyl ketone, cyclohexanone, cyclopentanone and acetophenone. Particularly preferred ketones are acetone, methyl ethyl ketone and methyl isobutyl ketone.

The cationic, amine-modified epoxy resins according to the invention can be used either as resins which crosslink by means of other substances or as self-crosslinking resins. Self-crosslinking resins are obtainable, for example, by reaction with partially blocked polyisocyanates, which on average contain one free isocyanate group per molecule The cationic, amine-modified epoxy resins according to the invention are preferably used as resins which crosslink by means of other substances.

The aqueous dispersions of the cationic, amine-modified epoxy resins according to the invention can be further processed to electro-dipcoating compositions by well known methods. For this purpose they are mixed, where appropriate, with at least one crosslinking agent, pigments, fillers and other generally well known additives, such as, for example, anti-foams, additional solvents, antioxidants, surface-active agents, flow auxiliaries and the like.

Examples of suitable crosslinking agents are phenoplasts, polyfunctional Mannich bases, melamine resins, benzoguanamine resins and blocked polyisocyanates. Blocked polyisocyanates are preferably used as crosslinking agents.

The blocked polyisocyanates used can be any polyisocyanates in which the isocyanate groups have been reacted with a compound so that the blocked polyisocyanate formed is resistant to hydroxyl and amino groups at room temperature but reacts at elevated temperatures, as a rule in the range from about 90° C. to about 300° C. Any organic polyisocyanates suitable for the crosslinking can be used for the preparation of the blocked polyisocyanates. The isocyanates which contain about 3 to 36, in particular about 8 to about 15 carbon atoms are preferred. Examples of suitable diisocyanates are hexamethylene diisocyanate, 2,4-toluylene diisocyanate, 2,6-toluylene diisocyanate, 4,4' and 2,4' diphenylmethane diisocyanate and a mixture of 4,4' and 2,4' diphenylmethane diisocyanate and 1-isocyanatomethyl-5-isocyanate-1,3,3-trimethylcyclohexane. Polyisocyanates having a larger number of isocyanate functional group can also be used. Examples of these compounds are trimerized hexamethylene diisocyanate and trimerized isophorone diisocyanate. Furthermore, mixtures of polyisocyanates can also be used. The organic polyisocyanates suitable as crosslinking agents in the case of the invention can also be prepolymers, which are derived, for example, from a polyol, including a polyether-polyol or a polyester-polyol. Any suitable aliphatic, cycloaliphatic or aromatic alkylmonoalcohols can be used for blocking the polyisocyanates. Examples of such compounds are aliphatic alcohols, such as methyl, ethyl, chloroethyl, propyl, butyl, amyl, hexyl, heptyl, octyl, nonyl, 3,3,5-trimethylhexyl, decyl and lauryl alcohol; cycloaliphatic alcohols, such as cyclopentanol and cyclohexanol; aromatic alkyl alcohols such as phenylcarbinol and methylphenylcarbinol.

Other suitable blocking agents are hydroxylamines, such as ethanolamine, oximes, such as methyl ethyl ketoneoxime, acetone oxime and cyclohexanone oxime, or amines, such as dibutylamine and diisopropylamine. In suitable proportions, the said polyisocyanates and blocking agents can also be used for the preparation of the partially blocked polyisocyanates mentioned above.

The crosslinking agent is used as a rule in an amount of 5 to 60% by weight, preferably 20 to 40% by weight, relative to the cationic amine-modified epoxy resin.

Pigments are preferably incorporated in the form of pigment pastes into the aqueous dispersion of the cationic, amine-modified epoxy resins.

The preparation of pigment pastes is generally known and does not need to be described in more detail here (cf. D. H. Parker, Principles of Surface Coating Technology, Interscience Publishers, New York (1965); R. L. Yates, Electropainting, Robert Draper Ltd., Teddington/England (1966); H.F. Payne, Organic Coating Technology, Volume 2, Wiley and Sons, New York (1961)).

In principle the pigment pastes can contain any pigments suitable for electro-dipcoating compositions. Titanium dioxide is in general the only or the main white pigment. Other white pigments or extenders, such as antimony oxide, zinc oxide, basic lead carbonate, basic lead sulfate, barium carbonate, porcelain, clay, calcium carbonate, aluminum silicate, silica, magnesium carbonate and magnesium silicate can however also be used. Colored pigments which can be used are, for example cadmium yellow, cadmium red, carbon black, phthalocyanine blue, chrome yellow, toluidyl red and hydrated iron oxide.

In addition to the pigments, the pigment paste can also contain plasticizers, fillers, wetting agents and the like.

The solids content of the electro-dipcoating compositions used according to the invention is preferably 7 to 35 parts by weight, particularly preferentially 12 to 25 parts by weight. The pH value of the electro-dipcoating compositions is between 4 and 8, preferably between 5 and 7.5.

The electro-dipcoating composition is brought into contact with an electrically conducting anode and with the electrically conductive substrate connected as cathode. A firmly adhering coating film is deposited on the cathode when electrical current passes between anode and cathode.

The voltage applied can vary within a wide range and can be, for example, between 2 and 1,000 volt. Typically, however, voltages of between 50 and 500 volts are used. As a rule the current density is between about 10 and 100 ampere/m$^2$. The current density tends to decrease in the course of the deposition.

After the deposition the coated object is rinsed off and is ready for baking.

The deposited coating films are generally baked at temperatures of 130° to 200° C. for a period of 10 to 60 minutes, preferably at 150° to 180° C. for a period of 15 to 30 minutes.

The process according to the invention can be used for coating any electrically conductive substrates, but in particular for coating metals such as steel, aluminum, copper and the like.

The aqueous coating compositions can also be applied by spraying, brushing, doctor blade and the like, both to electrically conducting and to non-electrically conducting substrates.

The invention is explained in more detail in the following examples. Unless expressly stated otherwise, all parts and percentage data are by weight.

I. Preparation of adducts C containing urethane groups

1. Ketimine-containing precursor c3 - 1

1,100 g of 2,2'-aminoethoxyethanol ($H_2N$—$CH_2$—$CH_2$—O—$CH_2$—$CH_2$—OH) and 1,886 g of methyl isobutyl ketone are initially introduced into a suitable reactor fitted with stirrer, inert gas inlet, water separator and reflux condenser, and slowly heated up in a nitrogen atmosphere, with stirring. At 109° C. a first noticeable distillation flow occurs, in which the first water of condensation is separated off. In the course of the reaction the temperature is increased in small steps to 142° C. over a period of 3 hours and this temperature is maintained until the reaction comes to a standstill and 189 g of water have been cycled out. The mixture is then cooled to 40° C. and discharged under nitrogen.

The cooled solution has an amine equivalent weight of 265.

2. Ketimine-containing precursor c3-2

836 g of ethanolamine ($H_2N$—$CH_2$—$CH_2$—OH) and 2,210 g of methyl isobutyl ketone are reacted in the manner described under I.1, until 150 g of water have been cycled out. The solution has an amine equivalent weight of 199.5.

3. Adduct C-1 containing urethane groups 1,154.3 g of polypropylene glycol with an average molecular weight of 900 (Lubrimet P 900, BASF company) together with 208.3 g of methyl isobutyl glycol are initially introduced into a reaction vessel fitted with water separator and reflux condenser, stirrer and inert gas inlet. The mixture is initially warmed to 68° C. to remove traces of water and is distilled under reflux under a slight vacuum for 30 min. Then 0.9 g of dibutyltin dilaurate are added to the mixture and 720.0 g of Desmodur W[1] (Bayer company) are allowed to run dropwise into the mixture at such a rate that the temperature remains between 68° and 60° C. The mixture is kept in this temperature range until the reaction solution has achieved an isocyanate equivalent weight of 670 (relative to the solid constituents). Then 713.3 g of c3-1 are allowed to run in, with cooling, over a period of 10 min. and the mixture is stirred at 60° C. until no further isocyanate groups can be detected by IR spectroscopy. The mixture is then cooled and diluted with 120 g of butyl glycol and 80 g of methyl isobutyl ketone The solution has a theoretical solids content of 80% and a base content of 0.9 meq/g of solid resin. The viscosity of a 60% solution (diluted with Solvenon PM (BASF company) and measured using a cone-and-plate viscometer) is 5.1 dPas.

[1] Desmodur W = dicyclohexylmethane diisocyanate

4. Adduct C-2 containing urethane groups 1,403 g of polyetherdiol Pluriol PE 3100[1] are dissolved in 230 g of methyl isobutyl ketone in a manner analogous to that described previously, and the solution is dehydrated by azeotropic distillation and reacted with 668 g of Desmodur W[2] (isocyanate equivalent weight 131, Bayer company) until an isocyanate equivalent weight of 852 (relative to solid constituents) is obtained. The mixture is then reacted with 633 g of precursor c3-1 until no further isocyanate groups are detectable (IR spectrum). The mixture is then diluted with 128 g of butyl glycol and 104 g of methyl isobutyl ketone. The solution has a theoretical solids content of 80%, the base content is 0.82 meq/g of solid resin. The viscosity (60% dilution with Solvenon PM, cone-and-plate viscometer) is 7.2 d Pas.

[1] BASF company; polyetherdiol based on ethylene oxide and propylene oxide with an average molecular weight of approximately 1,100
[2] Desmodur W = dicyclohexylmethane diisocyanate 5. Adduct C-3 containing urethane groups A precursor is prepared from 1,061 g of polycaprolactonediol Capa 200 (OH number 198; Interox company)

210 g of methyl isobutyl ketone 0.9 g of dibutyltin dilaurate 831 g of isophorone diisocyanate (NCO equivalent weight 111)

in the manner described under I.3, which precursor is further reacted, at a NCO equivalent weight of 510 (relative to solid material 90%), with 709 g of the ketimine-containing precursor c3-2 until an isocyanate content of 0 is obtained. After dilution with 189 g of methyl isobutyl ketone, the solution has a theoretical solids content of 80% and a base content of 1.30 meq/g of solid resin. The viscosity of a 60% sample is 4.2 dPas (diluted with Solvenon PM[1]), measured using a cone-and-plate viscometer).

[1] Solvenon PM = monoether of propylene glycol

II. Preparation of the amine-modified epoxy resins

1. Resin 1

1,359 g of epoxy resin, based on bisphenol A with an EEW[*] of 490 and 81 g of xylene are initially introduced into a suitable reactor and heated up to 108° C. under a nitrogen atmosphere. As soon as the melt is clear 182 g of dodecylphenol are added and the mixture is freed from traces of water within a period of 30 min by means of azeotropic reflux distillation under vacuum, using a water separator. Then 2.3 g of N,N-dimethylbenzylamine are added and the mixture is heated up to 130° C. The reaction mixture is held at this temperature until the EEW has reached a value of 1,110 (approximately 3.5 hours).

[*] EEW = epoxide equivalent weight in grams per equivalent. Unless otherwise stated, the EEW of solutions given in the following text relates to the solid constituents contained therein.

139 g of butyl glycol, 102 g of diethanolamine and 141 g of xylene are now added and during the addition the mixture is cooled to 90° C. 1 hour later 894 g of the adduct C-1 containing urethane groups, 139 g of Dowanol PPH [1]) (Dow Chemicals company), 42 g of glacial acetic acid and 12 g of Ha₂O are added and the mixture is allowed to react further at 90° C., until no further increase in viscosity is detectable (approximately 2 hours). The mixture is then cooled and diluted with 108 g of isobutanol. The resin solution has a solids content of 71.4% (measured after) 1 hour at approximately 130° C.) and a base content of 0.71 meq/g solid resin.

[1]) Dowanol PPH = propylene glycol monophenyl ether

2. Resin 2

1,351 g of epoxy resin based on bisphenol A (EEW 490; Shell company) and 81 g of xylene are melted with stirring under nitrogen at 110° C. analogously to the example described previously. After adding 181 g of dodecylphenol, residual traces of water are cycled out azeotropically under vacuum at 111° C. The mixture is then heated up to 130° C. and during this heating-up period 2.4 g of N,N-dimethylbenzylamine are added. The mixture is held at this temperature for approximately 4 hours until the EEW has risen to 1,109. 190 g of xylene and 101 g of diethanolamine are added and the mixture, which reacts slightly exothermically, is at the same time cooled down to 90° C. After the diethanolamine has reacted for 1 hour, 1,085 g of the urethane-containing ketimine adduct C-2 and 12 g of deionized water are added. The mixture is then allowed to react for 2 hours at 90° C., cooled down to 70° C. and discharged without further dilution.

The resin has a solids content of 83.1% (measured after 1 hour at 130° C.) and a base content of 0.67 meq/g of solid resin.

3. Resin 3

1,107 g of an epoxy resin based on bisphenol A with a EEW of 188, together with 335 g of bisphenol A, 168 g of nonylphenol and 85 g of xylene are initially introduced into a reactor and heated up to 130° C. with stirring and under a nitrogen atmosphere. Then 0.8 g of triphenylphosphine are added, after which the temperature rises to 152° C. After the exothermic reaction has subsided, the temperature is allowed to fall to 130° C. and 3.2 g of N,N-dimethylbenzylamine are added. As soon as the EEW has risen to 1,096, the reaction mixture is diluted with 102 g of butyl glycol and 243 g of xylene and cooled to 90° C. Then 108 g of diethanolamine are added, the mixture is allowed to react for 1 hour at 90° C. and 708 g of the urethane-containing adduct based on polycaprolactonediol C-3 and 13 g of H₂O are added. The mixture is then stirred for 2 hours at 80° C. and after brief cooling is diluted with 332 g of isobutanol. The resin has a solids content of 71.2% (measured after 1 hour at 130° C.) and a base content of 0.79 meq/g of solid resin.

III. Preparation of crosslinking agents

1. Crosslinking agent 1

1,133 g of toluylene diisocyanate (mixture of approximately 80% 2,4- and 20% 2,6- isomers) and 356 g of methyl isobutyl ketone are initially introduced under a nitrogen atmosphere into a reactor which is fitted with a stirrer, reflux condenser, internal thermometer and inert gas inlet. 0.7 g of dibutyltin dilaurate are added and 290 g of trimethylolpropane are added in the form of small portions at equal time intervals over a period of 4 hours. The cooling is regulated so that the temperature of the reaction mixture does not rise above 45° C. A NCO equivalent weight of 217 (relative to solid constituents) is measured 30 min. after addition of the final portion of trimethylolpropane. 722 g of n-propyl glycol are now allowed to run dropwise into the reaction mixture over a period of 1 hour, with further cooling. At the end of the addition the temperature has risen to 86° C. The mixture is now warmed to 100° C. and allowed to continue reacting for a further hour. No further NCO groups are detectable in the subsequent check. The mixture is now cooled and diluted with 500 g of methyl isobutyl ketone. The solution of this polyurethane crosslinking agent has a solids content of 69.8% (measured after 1 hour at 130° C.).

2. Crosslinking agent 2

1,146 g of trimerized hexamethylene diisocyanate with an NCO equivalent weight of 191 ("Basonat PLR 8638", BASF company) and 339 g of methyl isobutyl ketone are warmed to 50° C. with stirring under a nitrogen atmosphere in a reactor of the type described in the previous example. 774 g of di-n-butylamine are now added dropwise over a 4 hour period The temperature of the mixture is held below 55° C. by cooling during this addition. The crosslinking agent solution is then cooled and diluted with a further 141 g of methyl isobutyl ketone. The solids content is 69.5% (measured after 1 hour at 130° C.).

3. Crosslinking agent 3

A crosslinking agent containing activated ester groups is prepared in accordance with the patent application filed with the German Patent Office on 11.11.1987 under P 37 38 218.7 (Example 1).

1,035 g of azelaic acid are melted at 110° C. in the presence of 57 g of xylene and under inert gas in a suitable reaction vessel. 1.3 g of AMC-2 (catalyst based on Cr-III octoate, commercial product of Cordova Chemicals) are then added to the solution, which is now clear, and 876 g of an epoxy resin based on bisphenol A (epoxide equivalent weight 188) are introduced and reacted in portions with stirring over a period of 30 min. The water of condensation forming is then cycled out at 140°-180° C. via a water separator. The temperature is held at 180° C. until the acid number of the reaction mixture has fallen to 285. The mixture is then allowed to cool to 115° C., 4.0 g of the catalyst mentioned above are added and 1,324 g of 2-ethylhexylglycidyl ether are added dropwise over a period of 1.5 hours. The reaction is continued at 115° C. until the acid number is less than 1 mg KOH/g of solids and the EEW is greater than 10,000. A clear, green-tinged resin solution is obtained, which after brief cooling is discharged without further dilution. The crosslinking agent has a solids content of 95.6% (1 hour at 130° C.) and a viscosity of 2.5 dPas (70% in methyl isobutyl ketone).

IV. Preparation of aqueous binder dispersions

The aqueous binder dispersions are prepared from the components listed in the following table (Table 1) in the parts by weight given in the table. The procedure is as follows:

Resin, crosslinking agent and additives are mixed at room temperature and the prescribed quantity of glacial acetic acid is added. The first amount of water ($H_2O$ I) is then stirred in in portions The catalyst solution and, where appropriate, solvent and further coating composition auxiliaries are then added and the mixture is briefly homogenized and diluted to the final solids content with the second amount of water ($H_2O$ II) in small portions.

The dispersions are freed from volatile solvents in a subsequent vacuum distillation, the solvent removed by distillation being quantitatively replaced by water. The dispersion is then filtered.

TABLE 1

| | Aqueous binder dispersions (parts by weight in g) | | |
|---|---|---|---|
| Dispersion | 1 | 2 | 3 |
| Resin 1 (Ex. II. 1) | 911.3 | — | — |
| Resin 2 (Ex. II. 2) | — | 878.8 | — |
| Resin 3 (Ex. III. 3) | — | — | 1,120.— |
| Crosslinking agent 1 (Ex. III. 1) | 257.6 | 220.9 | — |
| Crosslinking agent 2 (Ex. III. 2) | 225.4 | 193.2 | — |
| Crosslinking agent 3 (Ex. III. 3) | — | — | 351.5 |
| Plastilit 3060 [1] | 89.6 | 89.6 | — |
| Anti-foam [2] | 2.2 | 2.2 | 2.2 |
| Lead octoate [3] | — | — | 22.4 |
| Isobutanol | — | 150.— | — |
| Glacial acetic acid | 5.7 | 17.8 | 26.— |
| $H_2O$ I | 756.— | 839.7 | 717.9 |
| $H_2O$ II | 1,153.9 | 1,760.— | 1,260.—. |

[1] Polypropylene glycol compound, BASF company
[2] 50% solution of Surfynol (Air Products company) in butyl glycol
[3] Commercially available solution (24% Pb)

V. Preparation of a gray pigment paste 27.81 parts of bisphenol A diglycidyl ether, 1.44 parts of xylene and 5.81 parts of bisphenol A are reacted in the presence of 0.002 part of triphenylphosphine at 150°-160° C. until an EEW of 345 is obtained. The batch is then diluted with 21.61 parts of butyl glycol and cooled to 49° C. A mixture of 7.77 parts of 9-amino-3,6-dioxanonan-1-ol and 4.07 parts of N,N-dimethylaminopropylamine is then added over a period of 6 min, whereupon the temperature rises to 110° C. The mixture is kept for 1 hour at between 110° and 115° C. before 6.45 parts of butyl glycol are added and the batch is cooled to 77° C. 14.9 parts of nonylphenol glycidyl ether are then added. Thereupon the temperature rises to 90° C. and this temperature is maintained for 1 hour before the batch is diluted with 10.03 parts of butyl glycol and cooled. The solids content of the resin solution, which is of low viscosity, is 60%.

To prepare the pigment paste, 29.33 parts of water, 1.59 parts of glacial acetic acid (90%) and 21.60 parts of the previously described resin solution are initially premixed. 0.7 part of anti-foam[1], 0.5 part of carbon black, 4.8 parts of basic lead pigment, 6.75 parts of extender HEWP[2], 32.48 parts of titanium dioxide (R 900) and 2.25 parts of dibutyltin oxide are now added and the mixture is predispersed for 30 min using a high-speed dissolver stirrer. The mixture is then dispersed in a small laboratory mill (Motor Mini Mill, Eiger Engineering Ltd. Great Britain) for 1 to 1.5 hours to a Hegmann fineness of less than/equal to 12 and finely adjusted to the desired processing viscosity with further water.

[1] "Tristar Antifoam" Tristar Chemical Co. Dallas, USA
[2] English China Clay Int. Great Britain A pigment paste which is very resistant to demixing results.

VI. Preparation of the electro-dipcoating baths and deposition of coating films For testing as cathodically depositable electro-dipcoating compositions, the aqueous binder dispersions from Table 1 are diluted with deionized water and 10% acetic acid in the parts by weight given in each case below. The respective pigment paste is then introduced with stirring into the binder dispersions diluted in this manner.

The electro-dipcoating baths are then allowed to age for 5 days at room temperature with stirring. The coating films are deposited for 2 minutes at the indicated voltage onto zinc-phosphated steel test panels connected as the cathode and onto non-pretreated steel panels connected as the cathode. During the deposition the bath temperature is held at 27° C. The wet films deposited are rinsed with deionized water and baked for 20 min. at 165° C.

Electro-dipcoating bath 1
2,325 parts of deionized water
3 parts of acetic acid (10%)
2,100 parts of dispersion 1 (Example IV, Table 1) and
572 parts of pigment paste (Example V)
are converted, as described above, into an electro-dipcoating composition. The solids content of the bath is 20%.

Deposition and testing of the films:

| Layer thickness: | 35 μm |
|---|---|
| Voltage: | 270 V |
| Flow[*] | 1 |
| Erichsen indentation | 7 |
| Crosshatch[*] | 0 |

[*] Rating: 0 best value, 5 worst value.

[*] Rating: 0 best value, 5 worst value.

The exposure of non-pretreated steel sheets to salt spray, as specified in ASTM B 117, resulted in an under-film creep of 1.0 mm (measured from the cut) after 360 hours.

Electro-dipcoating bath 2
2,500 parts of deionized water
3 parts of acetic acid (10%)
1,925 parts of dispersion 2 (Example IV, Table 1)
572 parts of pigment paste (Example V)
An electro-dipcoating composition bath was prepared from the components listed above in the manner already described. The solids content is 20%. The bath is an example of a coating composition according to the invention having a low content of organic solvents.

A sample of the coating composition taken after aging the bath for 5 days contains butyl glycol as the sole solvent in an amount of 0.5% by weight (determined by gas chromatography).

Deposition and testing of the films:

| Layer thickness | 25 μm |
|---|---|
| Voltage | 320 V |
| Flow | 1-2 |
| Erichsen indentation | 7.5 |
| Reverse impact (in-lb) | 40 |
| Bending on a conical mandrel as specified in ISO-standard (in cm) | 1 |
| Crosshatch | 0 |

Electro-diccoating bath 3
2,400 parts of deionized water
3 parts of acetic acid (10%)
2,025 parts of dispersion 3 (Example IV, Table 1)
572 parts of pigment paste (Example V)

An electro-dipcoating composition bath is prepared from the components listed above.

Deposition and testing of the film:

| Layer thickness: | 24 μm |
|---|---|
| Voltage: | 300 V |
| Flow | 2 |
| Erichsen indentation | 8 |
| Reverse impact (in-lb) | 80 |
| Crosshatch | 0 |

The exposure of non-pretreated steel sheets to salt spray, as specified by ASTM, gave an underfilm creep of less than 1 mm (measured from the cut) after 360 hours.

We claim:

1. A process for coating electrically conductive substrates, comprising the steps of:
   (1) dipping the substrate into an aqueous electrodipcoating composition, which contains at least one cationic, amine-modified epoxy resin as binder, the cationic amine-modified epoxy resin being obtained by reacting:
   (A) a compound which contains on average 1.0 to 5.0 epoxy groups per molecule, or a mixture of such compounds; and
   (B) an organic amine or a mixture of organic amines; and
   (C) an adduct containing urethane groups, which is obtained by reacting:
      (c1) a polyether- or polyester-polyol with a number-average molecular weight of 400 to 5,000, or a mixture of such polyether- and/or polyester-polyols;
      (c2) a polyisocyanate or a mixture of polyisocyanates; and
      (c3) a compound which contains at least one hydrogen atom which is reactive towards isocyanate groups and at least one ketimine group in the molecule, or a mixture of such compounds;
   with one another, and/or
   (D) an adduct containing urethane groups, which is obtained by converting at least one ketimine group in component (C) into a primary amino group by hydrolysis;
   wherein components (A), (B), (C), and (D) are reacted with one another in a relative proportion such that 20 to 90% of the epoxy groups of component (A) are reacted with component (B) and the remaining epoxy groups are reacted with component (C) and/or (D), and—if still necessary—at least partially protonating the reaction product thus obtained,
   (2) connecting the substrate as cathode;
   (3) depositing a film on the substrate by means of direct current;
   (4) removing the substrate from the electrodipcoating composition; and
   (5) baking the deposited coating film;
   which comprises using as component (A) a compound which is obtained by reacting:
      (i) a diepoxy compound or a mixture of diepoxy compounds having an epoxy equivalent weight below 2,000; with
      (ii) a compound containing a single phenolic hydroxyl group or a single mercapto group in the molecule;
   such that a reaction product is obtained in which components (i) and (ii) are incorporated in a molar ratio of 2:1 to 10:1.

2. The process as claimed in claim 1, wherein the adduct (C) is obtained by using a polyether-or polyester-diol or a mixture of polyether- and/or polyester-diols as component (c1), a diisocyanate or a mixture of diisocyanates as component (c2) and a compound which contains a hydrogen atom which is reactive towards isocyanate groups and at least one ketimine group in the molecule, or a mixture of such compounds as component (c3) and reacting the components (c1), (c2) and (c3) with one another in a relative proportion such that the adduct (C) contains no free isocyanate groups.

3. The process as claimed in claim 1, wherein the adduct (C) has a number-average molecular weight of 600 to 6,000.

4. The process as claimed in claim 11, wherein the adduct (C) is obtained by using a compound which contains a hydroxyl group and at least one ketimine group in the molecule, or a mixture of such compounds, as component (c3).

5. The process as claimed in claim 1, wherein the cationic, amine-modified epoxy resin is obtained by reacting the components (A), (B) and (C) with one another in an organic solvent or solvent mixture, in the presence of water and/or a Bronsted acid and at least partially protonating the reaction product.

6. An aqueous coating composition which contains a cationic amine-modified epoxy resin as binder, which is obtained by reacting:
   (A) a compound which contains on average 1.0 to 5.0 epoxy groups per molecule, or a mixture of such compounds; and
   (B) an organic amine or a mixture of organic amines; and
   (C) an adduct containing urethane groups, which is obtained by reacting:
      (c1) a polyether- or polyester-polyol with a number-average molecular weight of 400 to 5,000, or a mixture of such polyether- and/or polyester-polyols;
      (c2) a polyisocyanate or a mixture of polyisocyanates; and
      (c3) a compound which contains at least one hydrogen atom which is reactive towards isocyanate groups and at least one ketimine group in the molecule, or a mixture of such compounds;
   with one another, and/or (D) an adduct containing urethane groups, which is obtained by converting at least one ketimine group in component (C) into a primary amino group by hydrolysis;

wherein components (A), (B), (C), and (D) are reacted with one another in a relative proportion such that 20 to 90% of the epoxy groups of component (A) are reacted with component (B) and the remaining epoxy groups are reacted with component (C) and/or (D), and—if still necessary—at least partially protonating the reaction product thus obtained;

wherein component (A) is a compound which is obtained by reacting:

(i) a diepoxy compound or a mixture of diepoxy compounds having an epoxy equivalent weight below 2,000; with (ii) a compound containing a single phenolic hydroxyl group or a single mercapto group in the molecule;

such that a reaction product is obtained in which components (i) and (ii) are incorporated in a molar ratio of 2:1 to 10:1.

7. The coating composition as claimed in claim 6, wherein the adduct (C) is obtained by using a polyether- or polyester-diol or a mixture of polyether-and/or polyester-diols as components (c1), a diisocyanate or a mixture of diisocyanates as component (c2) and a compound which contains a hydrogen atom which is reactive towards isocyanate groups and at least one ketimine group in the molecule, or a mixture of such compounds as component (c3) and reacting the components (c1), (c2) and (c3) with one another in a relative proportion such that the adduct (C) contains no free isocyanate groups.

8. The coating composition as claimed in claim 6, wherein the adduct (C) has a number-average molecular weight of 600 to 6,000.

9. The coating composition as claimed in claim 6, wherein the adduct (C) is obtained by using a compound which contains a hydroxyl group and at least one ketimine group in the molecule, or a mixture of such compounds, as component (c3).

10. The coating composition as claimed in claim 6, wherein the cationic, amine-modified epoxy resin is obtained by reacting the components (A), (B) and (C) with one another, in an organic solvent or solvent mixture, in the presence of water and/or a Bronsted acid and at least partially protonating the reaction product.

11. A process for the preparation of a cationic, amine-modified epoxy resin, comprising the steps of reacting:

(A) a compound which contains on average 1.0 to 5.0 epoxy groups per molecule, or a mixture of such compounds; and (B) an organic amine or a mixture of organic amines; and (C) an adduct containing urethane groups, which is obtained by reacting:

(c1) a polyether- or polyester-polyol with a number-average molecular weight of 400 to 5,000, or a mixture of such polyether- and/or polyester-polyols;

(c2) a polyisocyanate or a mixture of polyisocyanates; and (c3) a compound which contains at least one hydrogen atom which is reactive towards isocyanate groups and at least one ketimine group in the molecule, or a mixture of such compounds; with one another, and/or (D) an adduct containing urethane groups, which is obtained by converting at least one ketimine group in component (C) into a primary amino group by hydrolysis;

wherein components (A), (B), (C), and (D) are reacted with one another in a relative proportion such that 20 to 90% of the epoxy groups of component (A) are reacted with component (B) and the remaining epoxy groups are reacted with component (C) and/or (D), and—if still necessary—at least partially protonating the reaction product thus obtained;

wherein component (A) is a compound which is obtained by reacting:

(i) a diepoxy compound or a mixture of diepoxy compounds having an epoxy equivalent weight below 2,000; with (ii) a compound containing a single phenolic hydroxyl group or a single mercapto group in the molecule;

such that a reaction product is obtained in which components (i) and (ii) are incorporated in a molar ratio of 2:1 to 10:1.

12. The process as claimed in claim 11, wherein the adduct (C) is obtained by using a polyether- or polyester-diol or a mixture of polyether- and/or polyester-diols as component (c1), a diisocyanate or a mixture of diisocyanates as component (c2) and a compound which contains a hydrogen atom which is reactive towards isocyanate groups and at least one ketimine group in the molecule, or a mixture of such compounds, as component (c3) and reacting the components (c1), (c2) and (c3) with one another in a relative proportion such that the adduct (C) contains no free isocyanate groups.

13. The process as claimed in claim 11, wherein the adduct (C) has a number-average molecular weight of 600 to 6,000.

14. The process as claimed in claim 11, wherein the adduct (C) is obtained by using a compound which contains a hydroxyl group and at least one ketimine group in the molecule, or a mixture of such compounds, as component (c3).

15. The process as claimed in claim 11, wherein the cationic, amine-modified epoxy resin is obtained by reacting the components (A), (B) and (C) with one another in an organic solvent or solvent mixture, in the presence of water and/or a Bronsted acid and at least partially protonating the reaction product.

16. A cationic, amine-modified epoxy resin which is prepared by the process as claimed in claim 11.

* * * * *